(12) United States Patent
Onda (10) Patent No.: US 6,389,231 B1
(45) Date of Patent: May 14, 2002

(54) LENS DRIVING APPARATUS, LENS GUIDING MECHANISM, AND OPTICAL INSTRUMENT

(75) Inventor: Kazuhiko Onda, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 100 days.

(21) Appl. No.: 09/599,451

(22) Filed: Jun. 22, 2000

(30) Foreign Application Priority Data

| | | | |
|---|---|---|---|
| Jun. 23, 1999 | (JP) | ......... | 11-176819 |
| Jun. 23, 1999 | (JP) | ......... | 11-176826 |
| Jun. 23, 1999 | (JP) | ......... | 11-176833 |

(51) Int. Cl.$^7$ ............................................. G03B 13/36
(52) U.S. Cl. ........................................................ 396/83
(58) Field of Search ...................... 396/79–83; 359/696, 359/697, 698

(56) References Cited

U.S. PATENT DOCUMENTS

| | | | | |
|---|---|---|---|---|
| 5,689,739 A | | 11/1997 | Yoshida et al. | ............... 396/83 |
| 5,752,095 A | * | 5/1998 | Tsuboi | ......................... 396/80 |
| 5,790,901 A | * | 8/1998 | Nakayama et al. | ....... 396/79 X |
| 5,983,032 A | * | 11/1999 | Miyamoto | .................... 396/83 |
| 6,061,524 A | * | 5/2000 | Uno | ............................ 396/83 |
| 6,278,843 B1 | * | 8/2001 | Iwasaki et al. | .......... 396/79 X |

FOREIGN PATENT DOCUMENTS

| | | | | |
|---|---|---|---|---|
| JP | 4-126235 | 11/1992 | ........... | G03B/17/04 |
| JP | 5-249632 | 9/1993 | ........... | G02B/7/08 |

* cited by examiner

Primary Examiner—W. B. Perkey
(74) Attorney, Agent, or Firm—Leydig, Voit & Mayer, Ltd.

(57) ABSTRACT

A lens driving apparatus includes an intermediate barrel movable along an optical axis of an optical system; a movable barrel, containing a front group lens, movable along the optical axis to retract or protrude with respect to the intermediate barrel as the intermediate barrel moves; and a link mechanism including two links intersecting each other at an axially supported intersecting part, a front end of the links being attached to the movable barrel, a rear end of the links being attached to the intermediate barrel, the link mechanism expanding and contracting as the intermediate barrel moves, to move the movable barrel along the optical axis. This lens driving apparatus can carry out power-changing and focusing operations using a single driving source and driving mechanism as the link mechanism extends and retracts the movable barrel, and the lens driving apparatus can be made smaller.

8 Claims, 8 Drawing Sheets

LENS DRIVING APPARATUS, LENS GUIDING MECHANISM, AND OPTICAL INSTRUMENT

BACKGROUND OF THE INVENTION

1. Field of the Invention

The present invention relates to a lens driving apparatus for a taking lens of a camera or the like, a lens guiding mechanism, and an optical instrument equipped with a taking lens and the like.

2. Related Background Art

A power-changing mechanism and a focusing mechanism are necessary for carrying out zooming in a taking lens for a camera or the like. If these mechanisms are made independent from each other, then a lens driving system comprising a lens driving motor, a lens position detecting device, and the like is needed for each mechanism, thus making it necessary to provide two lines of driving systems. This has been a great obstacle to reducing the size and cost of optical instruments such as camera.

In view of these disadvantages, as described in Japanese Patent Application Laid-Open No. HEI 5-249362, there has been proposed an optical instrument in a zoom taking optical system comprising a front group lens and a rear group lens, in which a holder barrel for the front group lens and a driving ring for moving it along the optical axis are connected to each other by means of a helicoid, a holding member for the rear group lens engages a cam groove formed in the inner periphery of the driving ring, and the driving ring is rotated, so as to move the front group lens together with the holder barrel and move the rear group lens along the cam groove.

The cam groove of this optical instrument has a flat region orthogonal to the optical axis and an oblique region not orthogonal thereto. The oblique region of the cam groove is used for moving the rear group lens upon a focus switching operation, whereas the flat region of the cam groove is used so as not to move the rear group lens upon a focusing operation. Using such a cam groove, this optical instrument is intended to carry out focus switching and focusing by use of a single driving source.

SUMMARY OF THE INVENTION

In the above-mentioned optical instrument, however, it is necessary that the driving ring be rotated about the optical axis upon focusing. Therefore, the technique of such an optical instrument is not applicable to those moving the rear group lens without rotating the driving ring or those having no driving ring.

As those moving the rear group lens without rotating the driving ring or those having no driving ring, on the other hand, lens driving mechanisms having a lens barrel with a quadrangular cross section have been known as described in Japanese Utility Model Registration No. 2548509 and Japanese Patent Application Laid-Open No. HEI 9-222550. These lens driving mechanisms, however, do not disclose any power-changing and focusing operations by use of a single driving source and driving mechanism. There has also been a desire for developing a technique capable of carrying out power-changing and focusing operations by use of a single driving source and driving mechanism in these lens driving mechanisms having a lens barrel with a quadrangular cross section and the like.

Further, there has been a desire for developing a technique for reducing the size and cost of optical instruments by carrying out power-changing and focusing operations by means of a single driving source and driving mechanism in a lens driving mechanism having a lens barrel with a quadrangular cross section and the like.

Therefore, in view of such technical problems, it is an object of the present invention to provide a lens driving apparatus, a lens guiding mechanism, and an optical instrument which are capable of carrying out power-changing and focusing operations by use of a single driving source and driving mechanism, and a lens driving apparatus which can be made smaller.

For achieving such an object, the present invention provides a lens driving apparatus used in a zoom lens optical system having at least a front group lens and a rear group lens, in which the front group lens and the rear group lens are moved along an optical axis for power changing and focusing, the lens driving apparatus comprising: an intermediate barrel movable along the optical axis of the optical system; a movable barrel, containing the front group lens, movable along the optical axis so as to retract or protrude with respect to the intermediate barrel as the intermediate barrel moves; and movable barrel moving means constituted by two link pieces intersecting each other at an axially supported intersecting part, a front end of the link pieces being attached to the movable barrel, a rear end of the link pieces being attached to the intermediate barrel, the movable barrel moving means being adapted to expand and contract as the intermediate barrel moves, so as to move the movable barrel along the optical axis.

According to this aspect of the present invention, if the intermediate barrel and the movable barrel are retracted into a collapsed state, then each link piece of the movable barrel moving means is collapsed, so as to reduce its size in the optical axis direction. As a consequence, optical instruments can be made smaller.

The lens driving apparatus in accordance with the present invention may comprise rear group lens moving means, pivotally attached to the movable barrel, for moving the rear group lens along the optical axis in synchronization with a movement of the movable barrel.

This configuration makes it possible to move the rear group lens differently from the movable barrel. Consequently, the distance between the rear group lens and the front group lens can be adjusted, so as to carry out an appropriate power-changing operation.

In the lens driving apparatus in accordance with the present invention, it is desirable that a fixed barrel from/into which the intermediate barrel is protruded/retracted be provided with a cam plate, the cam plate be formed with a cam groove which is oblique with respect to the optical axis, and the rear end of one of the link pieces engage the cam groove. This configuration makes it possible for the amount of movement of the movable barrel caused by the movement of the intermediate barrel to be set arbitrarily by the cam groove, whereby the lens position optimal for zoom focus control can be set.

Also, the present invention provides a lens driving apparatus used in a zoom lens optical system having at least a front group lens and a rear group lens, in which the front group lens and the rear group lens are moved along an optical axis for power changing and focusing, the lens driving apparatus comprising: an intermediate barrel movable along the optical axis; intermediate barrel moving means for moving the intermediate barrel along the optical axis; a movable barrel, containing the front group lens, adapted to retract or protrude with respect to the intermediate barrel in synchronization with a movement of the intermediate barrel; a rear group lens frame, containing the rear group lens, disposed so as to be movable along the optical axis; rear group lens moving means for moving the rear group lens frame along the optical axis in synchronization with a movement of the movable barrel; and rear group lens holding means for breaking the synchronization between the intermediate barrel and the movable barrel in a predetermined movement range when the intermediate barrel is moved in an opposite direction, so as to hold the rear group lens frame with respect to the intermediate barrel.

The lens driving apparatus in accordance with the present invention may be configured such that the intermediate barrel is moved in a predetermined direction for power changing and an opposite direction for focusing.

According to these aspects of the present invention, while the rear group lens moves along the optical axis in synchronization with a movement of the intermediate barrel, the rear group lens will move together with the intermediate barrel as being held thereby if the intermediate barrel is moved in the opposite direction. As a consequence, the distance between the rear group lens and the front group lens can be adjusted by a single driving mechanism and driving means for driving the intermediate barrel, such that a locus different from that for power changing is attained so as to enable appropriate focusing.

The present invention provides a lens guiding mechanism in a zoom lens optical system in which at least a front group lens and a rear group lens are moved along an optical axis for power changing and focusing, the lens guiding mechanism comprising: a guide axis, oriented in parallel with the optical axis, having a surface formed with a plurality of grooves at a predetermined interval; a front group lens container, containing the front group lens, movable along the guide axis; a rear group lens container, containing the rear group lens, supported so as to be movable within a predetermined range in the optical axis direction with respect to the front group lens container; and holding means, installed in the rear group lens container, for elastically pressing the surface of the guide axis, so as to hold the rear group lens container at a groove position.

According to this aspect of the present invention, if the front group lens container is moved along the guide axis, then the rear group lens container moves along therewith. As the front group lens container is moved, the rear group lens container can be moved to a groove position of the guide axis and can be held to the guide axis with the aid of the holding means, so as to allow the optical system to change its power. Also, if the front group lens container is moved in this state, then the front group lens moves toward or away from the rear group lens, whereby focusing of the optical system can be carried out. Therefore, a single driving source enables stepwise zooming.

The present invention provides an optical instrument having a zoom lens optical system in which at least a front group lens and a rear group lens are moved along an optical axis for power changing and focusing, the optical instrument comprising: a first guide axis, oriented in parallel with the optical axis, having a surface formed with a groove oriented to intersect the optical axis; a front group lens container, containing the front group lens, movable along the first guide axis; a rear group lens container, containing the rear group lens and comprising a presser for elastically pressing the surface of the first guide axis, movable along the optical axis; and rear group lens moving means, installed in the front group lens container, movable together with the front group lens container; the rear group lens moving means applying, along with a movement thereof, a moving force for moving the rear group lens container along the optical axis to the rear group lens container and applying no moving force to the rear group lens container within a predetermined movement range when a direction of movement thereof changes.

According to this aspect of the present invention, if the presser engages the groove of the first guide axis while the rear group lens container is held by the first guide, then the amount of movement of the front group lens and that of the rear group lens can be made different from each other. Therefore, the power of the optical system can be changed by moving the front group lens container along the guide axis, and focusing of the optical system can be carried out by shifting the rear group lens in the moving direction of the front group lens container thereafter so as to move the rear group lens toward or away from the front group lens. Hence, a single driving source and driving mechanism for driving the front group lens container enables appropriate power changing and focusing of the optical system.

The optical instrument in accordance with the present invention may comprise a second guide axis, installed in the front group lens container, for guiding the rear group lens container in parallel with the optical axis, the presser of the rear group lens container being disposed between the first guide axis and the second guide axis.

This configuration makes it possible for the second guide axis to receive the reaction force of the presser for pressing the first guide axis. As a consequence, rotational forces about the second guide axis can be prevented from applying to the rear group lens container, whereby the rear group lens container can appropriately be moved along the optical axis.

DESCRIPTION OF THE PREFERRED EMBODIMENTS

In the following, various embodiments of the present invention will be explained with reference to the accompanying drawings. Constituents identical to each other among the drawings will be referred to with numerals identical to each other without repeating their overlapping explanations. Also, ratios of dimensions in the drawings do not always coincide with those explained.

First Embodiment

Figure 1:
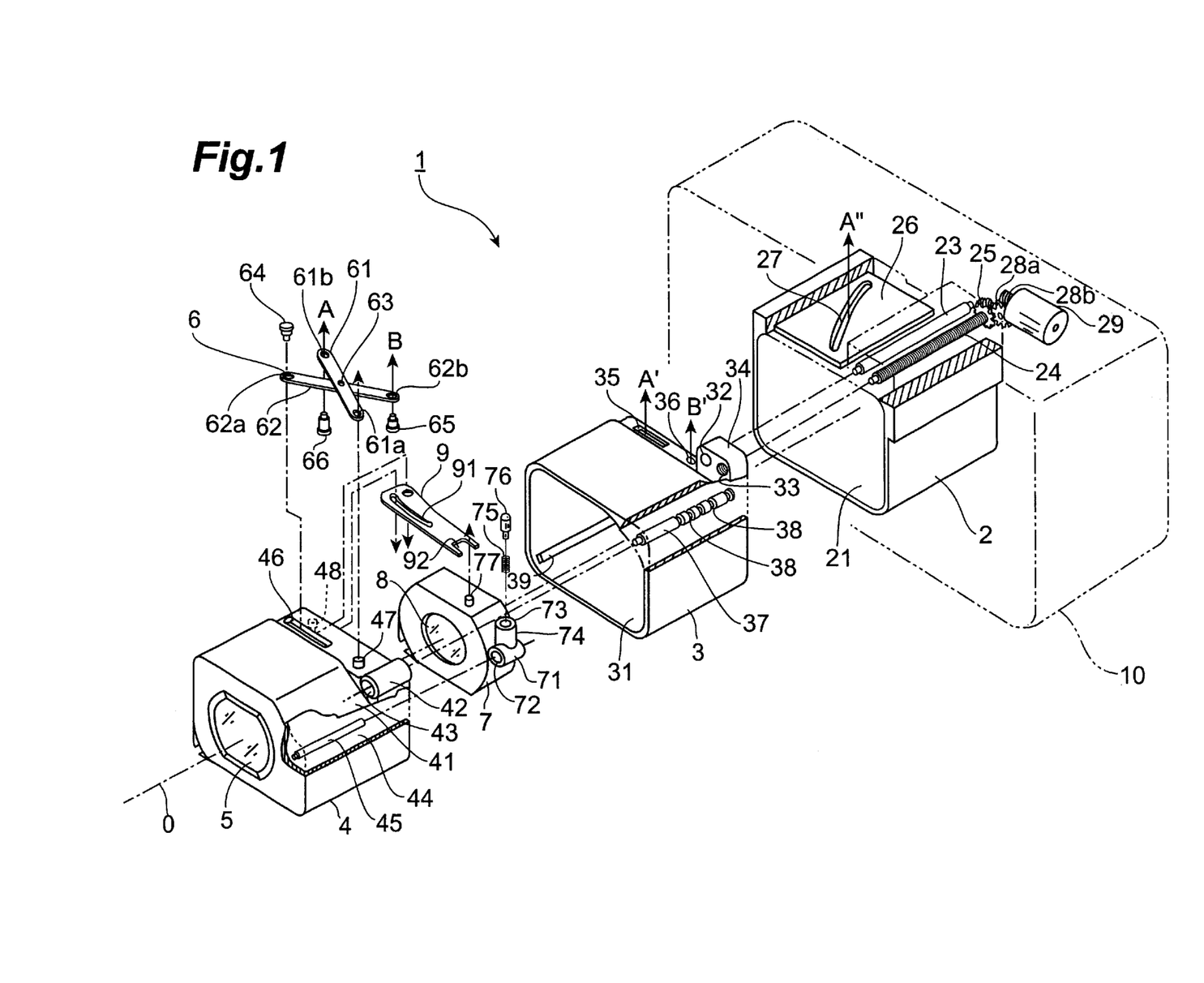
FIG. 1 is an exploded perspective view of a camera in accordance with an embodiment of the present invention.

FIG. 1 shows a camera 1 in accordance with this embodiment. The camera 1 uses a zoom lens optical system in the optical system of its taking lens, whereas the optical system employs the lens driving apparatus and lens guiding mechanism in accordance with this embodiment.

As shown in FIG. 1, the camera 1 is provided with a fixed barrel 2. The fixed barrel 2 is a tubular body having an inner space 21 with a substantially quadrangular cross section, and is secured to or integrally formed with the main body (not depicted) of the camera 1, for example.

The upper part of the fixed barrel 2 is provided with a guide axis container 22. The guide axis container 22 is formed by projecting the upper face of the fixed barrel 2 upward, and contains therein a guide axis 23 and a feed screw 24. Each of the guide axis 23 and the feed screw 24 is shaped like a rod, and is oriented in parallel with the optical axis O. The feed screw 24 is disposed so as to be rotatable, and its outer periphery is formed witha thread ridge, whereas a helical gear 25 is attached to the rear end thereof. By way of a helical gear 28a and a worm gear 28b, the rotational force of a motor 29 is transmitted to the helical gear 25. As the rotational force is transmitted, the helical gear 25 rotates, and the feed screw 24 rotates along therewith. The transmission mechanism for transmitting the rotational force of the motor 29 to the feed screw 24 is not limited to the mechanism constituted by the helical gears 25, 28a and worm gear 28b, but one comprising a spur gear may also be used.

A cam plate 26 is attached to the upper face of the inner space 21 in the fixed barrel 2. In the cam plate 26, a cam groove 27 is formed oblique with respect to the optical axis O.

The camera 1 is provided with an intermediate barrel 3 capable of protruding from and retracting into the fixed barrel 2. The intermediate barrel 3 is a tubular body having an inner space 31 with a substantially quadrangular cross section, and forms a projection 34 at the upper part of its rear end. The projection 34 is formed with two insertion holes 32, 33 opening in parallel with the optical axis O. The insertion hole 32 is a hole for inserting therethrough the guide axis 23 of the fixed barrel 2. Since the guide axis 23 is inserted through the insertion hole 32, the intermediate barrel 3 is movable along the optical axis O.

On the other hand, the insertion hole 33 is a hole for inserting therethrough the feed screw 24 of the fixed barrel 2, and its inner periphery is formed with a thread groove mating with the thread ridge of the screw thread 24. As the feed screw 24 inserted through the insertion hole 33 rotates, the intermediate barrel 3 moves along the optical axis O.

Though all or part of the intermediate barrel 3 is contained in the inner space 21 of the fixed barrel 2 whenever protruded or retracted, the intermediate barrel 3 is shown in a state removed from the fixed barrel 2 in FIG. 1 for convenience of explanation.

A long hole 35 and a circular hole 36 are formed in the upper part of the rear end of the intermediate barrel 3 so as to communicate the inside and outside of the inner space 31 to each other. The long hole 35 is formed such that its longitudinal axis is orthogonal to the optical axis O. On a longitudinal extension of the long hole 35, the circular hole 36 is formed in parallel with the long hole 35.

A guide axis 37 is mounted in the inner space 31 of the intermediate barrel 3. The guide axis 37 is shaped like a rod and is oriented in parallel with the optical axis O. The outer peripheral face of the guide axis 37 is formed with a plurality of grooves 38. The grooves 38 are annular grooves formed along the circumferential direction of the guide axis 37. For example, five such grooves are formed in a row in the axial direction of the guide axis 37 at predetermined intervals. The guide axis 37 is installed at a position under the guide axis 23 at an upper corner of the inner space 31. A guide projection 39 is formed on the inner wall of the intermediate barrel 3 at a lower corner position which is diagonally opposite to the guide axis 37.

The camera 1 is formed with a movable barrel 4 adapted to protrude from and retract into the intermediate barrel 3. The movable barrel 4 is a tubular body having a cross section lacking one corner of a quadrangle, and contains a front group lens 5 in the front face part thereof. The rear end of the movable barrel 4 is open.

A projection 42 is formed behind the cutout 41 of the movable barrel 4. The projection 42 is formed with an insertion hole 43 opening in parallel with the optical axis O. The insertion hole 43 is a hole for inserting therethrough the guide axis 37 of the intermediate barrel 3. Since the guide axis 37 is inserted through the insertion hole 43, the movable barrel 4 is movable along the optical axis O. Though all or part of the movable barrel 4 is contained in the inner space 31 of the intermediate barrel 3 whenever protruded or retracted, the movable barrel 4 is shown in a state removed from the intermediate barrel 3 in FIG. 1 for convenience of explanation.

A guide axis 45 is disposed in an inner space 44 of the movable barrel 4. The guide axis 45 is shaped like a rod and is oriented in parallel with the optical axis O. The upper part of the rear end of the movable barrel 4 is formed with a long hole 46 communicating the inside and outside of the inner space 44 to each other. The long hole 46 is formed such that its longitudinal direction is orthogonal to the optical axis O. Also, a protuberance 47 is disposed on a longitudinal extension of the long hole 46.

The camera 1 is provided with an X-shaped link mechanism 6 for protruding and retracting the movable barrel 4. The link mechanism 6 is constituted by two links 61, 62 intersecting each other in an X-shape with their intersecting part axially supported by a hinge pin 63. The front end 61a of the link 61 is pivotally attached to the protuberance 47 of the movable barrel 4. A pin 64 penetrates through the front end 62a of the link 62 from the upper side thereof, and further penetrates through the long hole 46 of the movable barrel 4. Therefore, the front end 62a of the link 62 is movable along the longitudinal axis of the long hole 46 and is restrained from moving in other directions.

As indicated by arrow B in FIG. 1, a pin 65 penetrates through the rear end 62b of the link 62 from the lower side. Also, the pin 65 penetrates through the circular hole 36 of the intermediate barrel 3 as indicated by arrow B' in FIG. 1. As a consequence, the rear end 62b of the link 62 is pivotally attached to the position where the circular hole 36 opens. Further, as indicated by arrow A in FIG. 1, a pin 66 penetrates through the rear end 61b of the link 61 from the lower side. Also, as indicated by arrow A' in FIG. 1, the pin 66 penetrates through the long hole 35 of the intermediate barrel 3. Therefore, the rear end 61b of the link 61 is movable along the longitudinal axis of the long hole 35 and is restrained from moving in other directions. Further, as indicated by arrow A" in FIG. 1, the pin 66 is inserted through the cam groove 27 of the cam plate 26 installed in the fixed barrel 2. Consequently, as the intermediate barrel 3 moves along the optical axis O with respect to the fixed barrel 2, the pin 66 moves along the cam groove 27, whereby the angle of intersection between the links 61, 62 of the link mechanism 6 changes. Upon this change in the angle of intersection, the link mechanism 6 extends or contracts in parallel with the optical axis O, so that the movable barrel 4 moves relative to the intermediate barrel 3, thereby protruding or retracting.

The camera 1 is provided with a rear group lens frame 7 movable along the optical axis O behind the front group lens 5 of the movable barrel 4. The rear group lens frame 7 is a frame containing a rear group lens 8, and has a bearing part 71 at an outer edge portion thereof. The bearing part 71 is formed with a bearing hole 72 opening in parallel with the optical axis O. The bearing hole 72 is a hole for inserting therethrough the guide axis 45 of the movable barrel 4. Since the guide axis 45 is inserted through the bearing hole 72, the rear group lens frame 7 is movable along the optical axis O. Though all or part of the rear group lens frame 7 is contained in the inner space 44, 31 of the movable barrel 4 or intermediate barrel 3 whenever protruded or retracted, the rear group lens frame 7 is shown in a state removed from the movable barrel 4 or intermediate barrel 3 in FIG. 1 for convenience of explanation.

A pressing part 73 is disposed on the upper side of the bearing part 71 of the rear group lens frame 7. The pressing part 73 elastically presses the guide axis 37 attached to the intermediate barrel 3, and is constituted by a tubular part 74 with an open upper face, and a coil spring 75 and a presser 76 which are contained therein. The presser 76 is a rod having a hemispherical head, whereas the head is pressed against the outer peripheral face of the guide axis 37 under the stress of the coil spring 75.

The pressing part 73 may be constituted by any elastic member, such as leaf spring, as long as it can elastically press the guide axis 37.

The presser 76 is disposed between the guide axes 37, 45, for example, on a line connecting the respective axial centers of the guide axes 37, 45. Therefore, the reaction force of the presser 76 pressing the guide axis 37 can be received by the guide axis 45. As a consequence, rotational forces about the guide axis 45 can be kept from applying to the rear group lens frame 7 when the presser 76 is pressed, whereby the rear group lens frame 7 can be moved appropriately along the optical axis O.

The camera 1 is provided with a cam lever 9. The cam lever 9 is used for moving the rear group lens frame 7 along the optical axis O, and is pivotally attached to a protuberance 48 projecting from the inner wall of the inner space 44 of the movable barrel 4. The cam lever 9 is formed with a cam groove 91, whereas the pin 64 inserted through the front end 62a of the link 62 and the long hole 46 is inserted through the cam groove 91. The front end of the cam lever 9 is formed with a cutout 92. The cutout 92 engages a protuberance 77 projecting from the upper face of the rear group lens frame 7.

Upon an operation of protruding or retracting the movable barrel 4, the pin 64 moves along the long hole 46, whereby the cam lever 9 pivots about the protuberance 48.

Upon this pivotal movement, the cutout 92 pushes the protuberance 77, whereby the rear group lens frame 7 moves along the optical axis O.

On the other hand, the cutout 92 is formed with a width greater than the diameter of the protuberance 77. As a consequence, if the direction of pivotal movement of the cam lever 9 changes, then the rear group lens frame 7 will not move in an opposite direction unless the cam lever 9 pivots by an amount not smaller than the difference between the width of the cutout 92 and the diameter of the protuberance 77.

Here, a protuberance may be provided on the cam lever 9 side, and a cutout or groove may be provided on the rear group lens frame 7 side, so that the rear group lens frame 7 moves upon the pivotal movement of the cam lever 9.

Also, the width of the cam groove 91 may be made greater than the diameter of the pin 64 while the width of the cutout 92 is made identical to the diameter of the protuberance 77, so as to yield a structure in which the rear group lens frame 7 would not move in an opposite direction unless the cam lever 9 pivots by an amount not smaller than the difference between the width of the cam groove 91 and the diameter of the pin 64.

Operations of the lens driving apparatus, lens guiding mechanism, and camera in accordance with this embodiment will now be explained.

Figure 2:
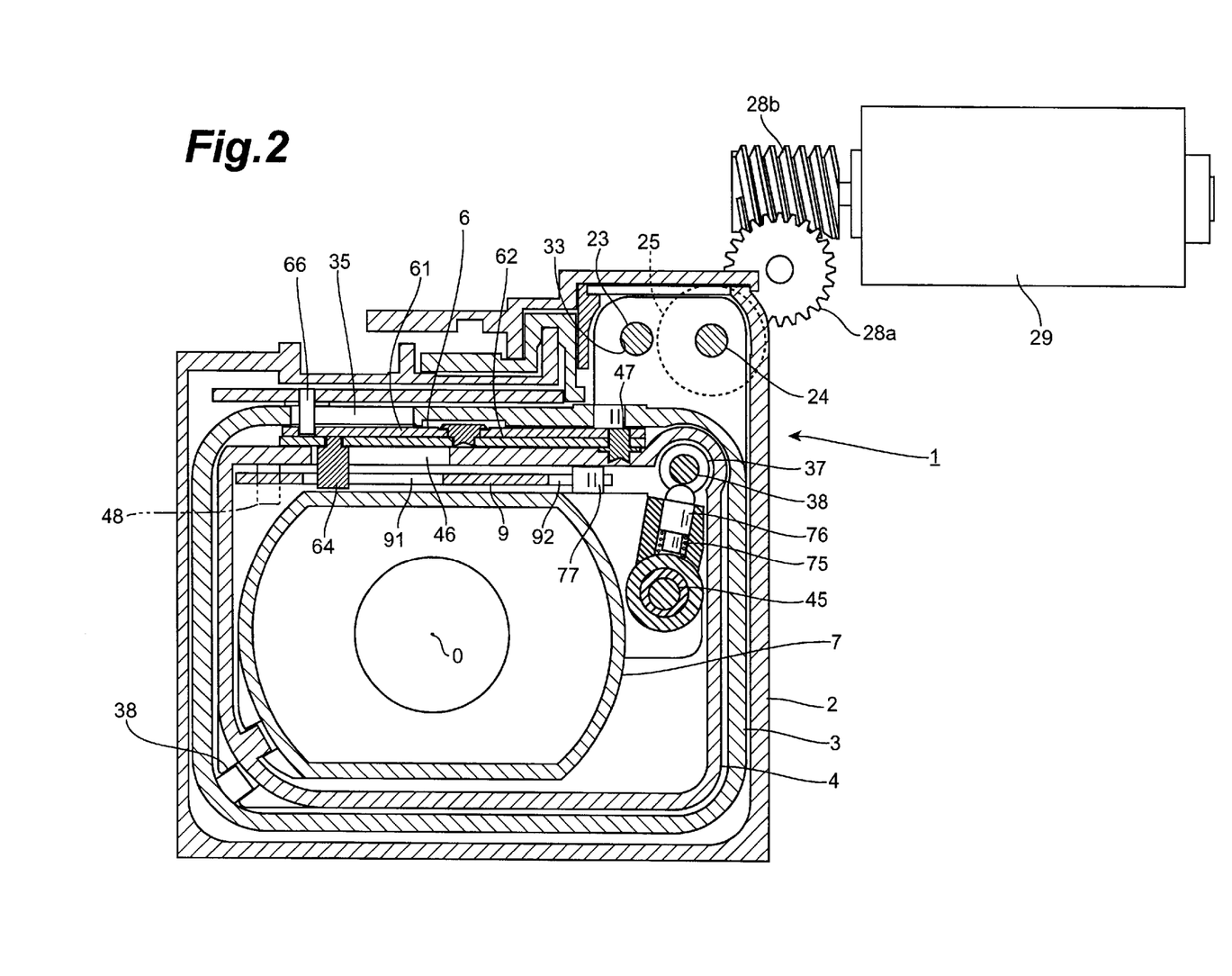
FIG. 2 is a front view of the camera of FIG. 1.
Figure 3:
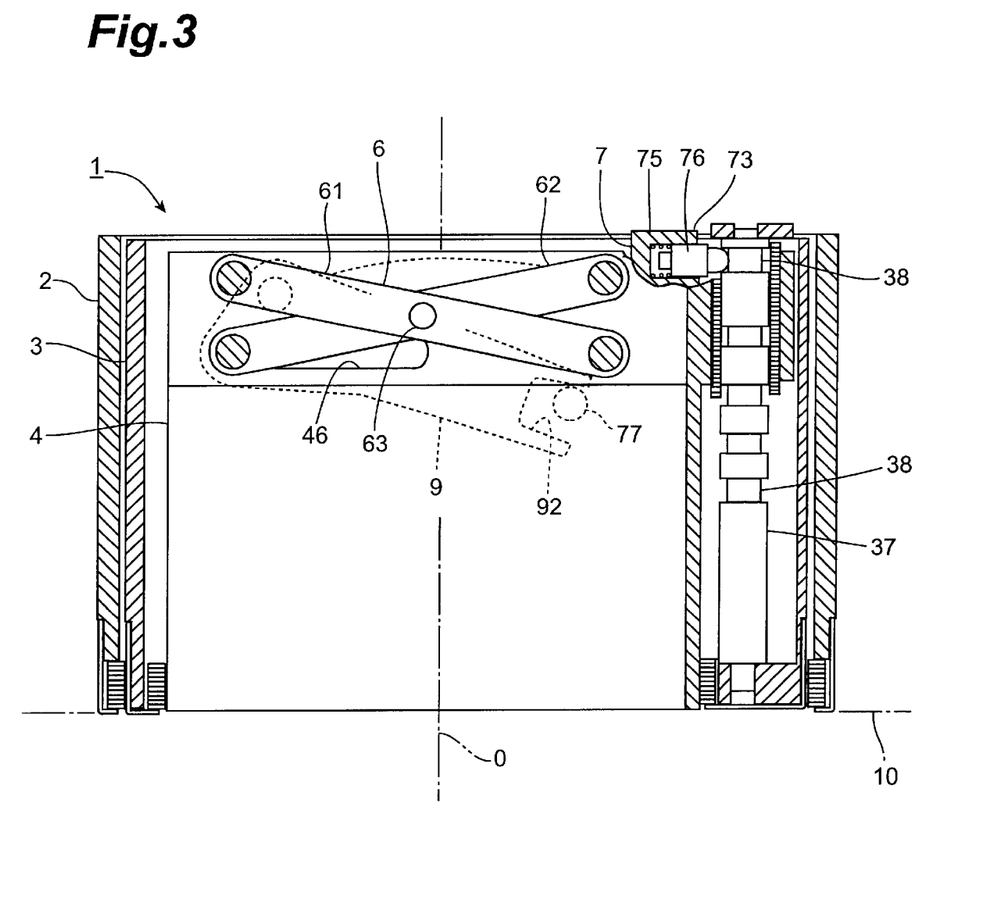
FIG. 3 is an explanatory view of an operation of the camera of FIG. 1.

FIG. 2 shows a vertical sectional view of the camera when collapsed as viewed from the front side, whereas FIG. 3 shows a horizontal sectional view of the camera when collapsed.

When the camera is collapsed, as shown in FIG. 2, the intermediate barrel 3 is retracted into the fixed barrel 2, and the movable barrel 4 is retracted into the intermediate barrel 3. Here, as shown in FIG. 3, the link mechanism 6 is collapsed in the rear end parts of the movable barrel 4 and intermediate barrel 3, so as to be just contained in the rear end parts in the movable barrel 4 and intermediate barrel 3, which would not be exposed to the outside of the camera 1 even when expanded to the maximum. Therefore, the space within the camera 1 can efficiently be utilized so as to contain the link mechanism 6 therein, whereby the movable barrel 4 and the intermediate barrel 3 can be made longer in the optical axis direction. Hence, the camera 1 can be made smaller.

Also, since the movable barrel 4 is formed with the cutout 41, the movable barrel 4 can be retracted into the intermediate barrel 3 having the guide axis 37 therein. Since the inner space 31 of the intermediate barrel 3 is efficiently utilized as such, the intermediate barrel 3 can be made smaller, whereby the camera 1 can reduce its dimensions. Also, the movable barrel 4 can attain its maximum dimensions within the intermediate barrel 3.

In the collapsed state, the presser 76 of the pressing part 73 of the rear group lens frame 7 is in a groove 38 of the guide axis 37, whereby the rear group lens frame 7 is held with respect to the intermediate barrel 3.

When a main switch is turned ON in the camera 1, then the motor 29 is driven, and its driving force is transmitted to the helical gear 25 by way of the worm gear 28b and the helical gear 28a, where by the helical gear 25 starts rotating. Along with this rotation, the feed screw 24 rotates within the fixed barrel 2, whereby the intermediate barrel 3 moves along the optical axis O so as to protrude from the fixed barrel 2. Here, since the rotational driving of the motor 29 is sufficiently decelerated by the threaded structure between the feed screw 24 and the insertion hole 33, it is unnecessary to separately install decelerating means.

Figure 4:
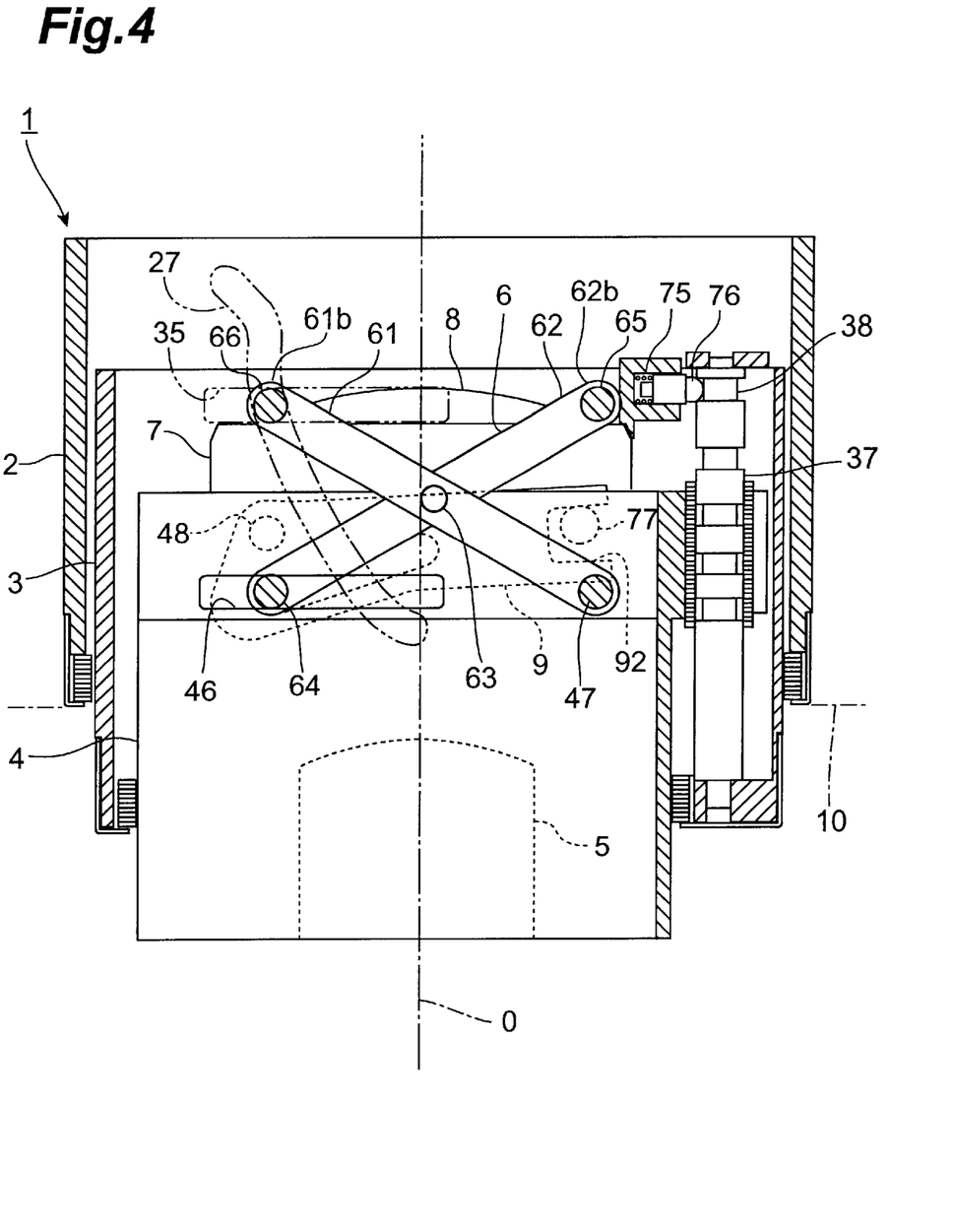
FIG. 4 is an explanatory view of an operation of the camera of FIG. 1.

Meanwhile, if the intermediate barrel 2 moves, then the rear end 61b of the link 61 in the link mechanism 6 moves along the cam groove 27 as shown in FIG. 4. Therefore, as the intermediate barrel 2 moves, the rear end 61b of the link 61 moves toward the rear end 62b of the link 62, so as to increase the angle of intersection between the links 61, 62, whereby the collapsed link mechanism 6 extends in parallel with the optical axis O. As a consequence, the movable barrel 4 engaging the respective front ends 61a, 62a of the links 61, 62 in the link mechanism 6 protrudes from intermediate barrel 3 and moves to a position (WIDE wait position) at which a photograph can be taken.

On the other hand, while the movable barrel 4 containing the front group lens 5 moves from the collapsed position to the WIDE wait position, the rear group lens frame 7 containing the rear group lens 8 moves along the optical axis to the WIDE wait position of the movable barrel 4 while in a state held by the intermediate barrel 3.

If the shutter switch is pushed in this state, then the motor 29 rotates in reverse, so that the feed screw 24 is conversely rotated by way of the worm gear 28b and helical gears 28a, 25, whereby the intermediate barrel 3 is retracted.

Figure 5:
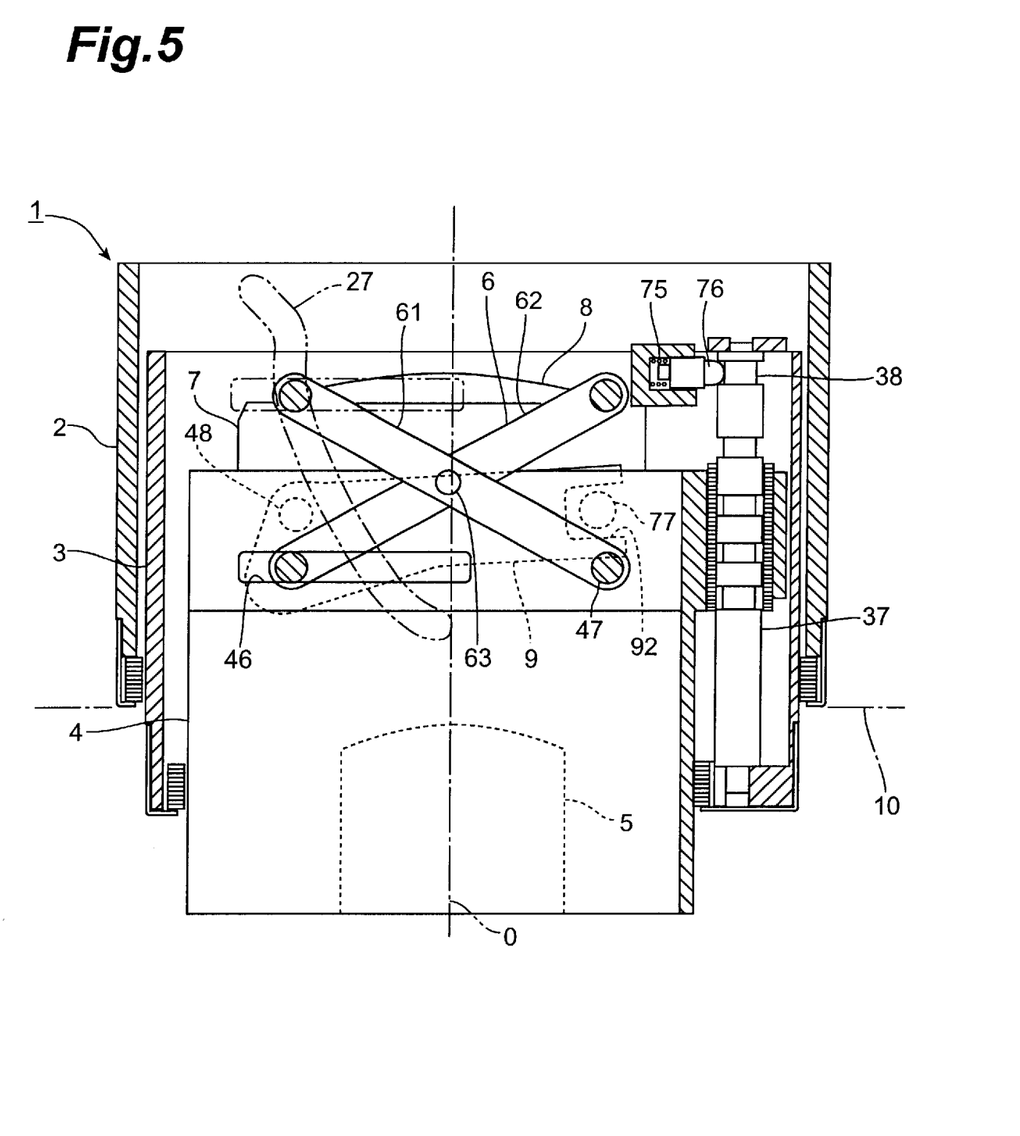
FIG. 5 is an explanatory view of an operation of the camera of FIG. 1.

Also, as shown in FIG. 5, when the intermediate barrel 3 is retracted, the link mechanism 6 contracts, whereby the movable barrel 4 is retracted. Here, the retracting operation of the movable barrel 4 pivots the cam lever 9 about the protuberance 48 toward the retracting side. However, since the cutout 92 of the cam lever 9 is formed greater than the outside diameter of the protuberance 77 of the rear group lens frame 7, the rear group lens frame 7 is not moved by the pivoting of the cam lever 9, but is moved together with the intermediate barrel 3 while being held thereby. As a consequence, the front group lens 5 of the movable barrel 4 approaches the rear group lens 8 of the rear group lens frame 7, whereby appropriate focusing can be effected in the optical system constituted by the front group lens 5 and rear group lens 8, and wide-angle photography is possible.

When a zooming operation of the camera 1 is carried out for telephotography, the motor 29 is driven, whereby the feed screw 24 is rotated by way of the worm gear 28b and the helical gears 28a, 25. upon this rotation, the intermediate barrel 3 moves along the optical axis O, so as to protrude from the fixed barrel 2.

Figure 6:
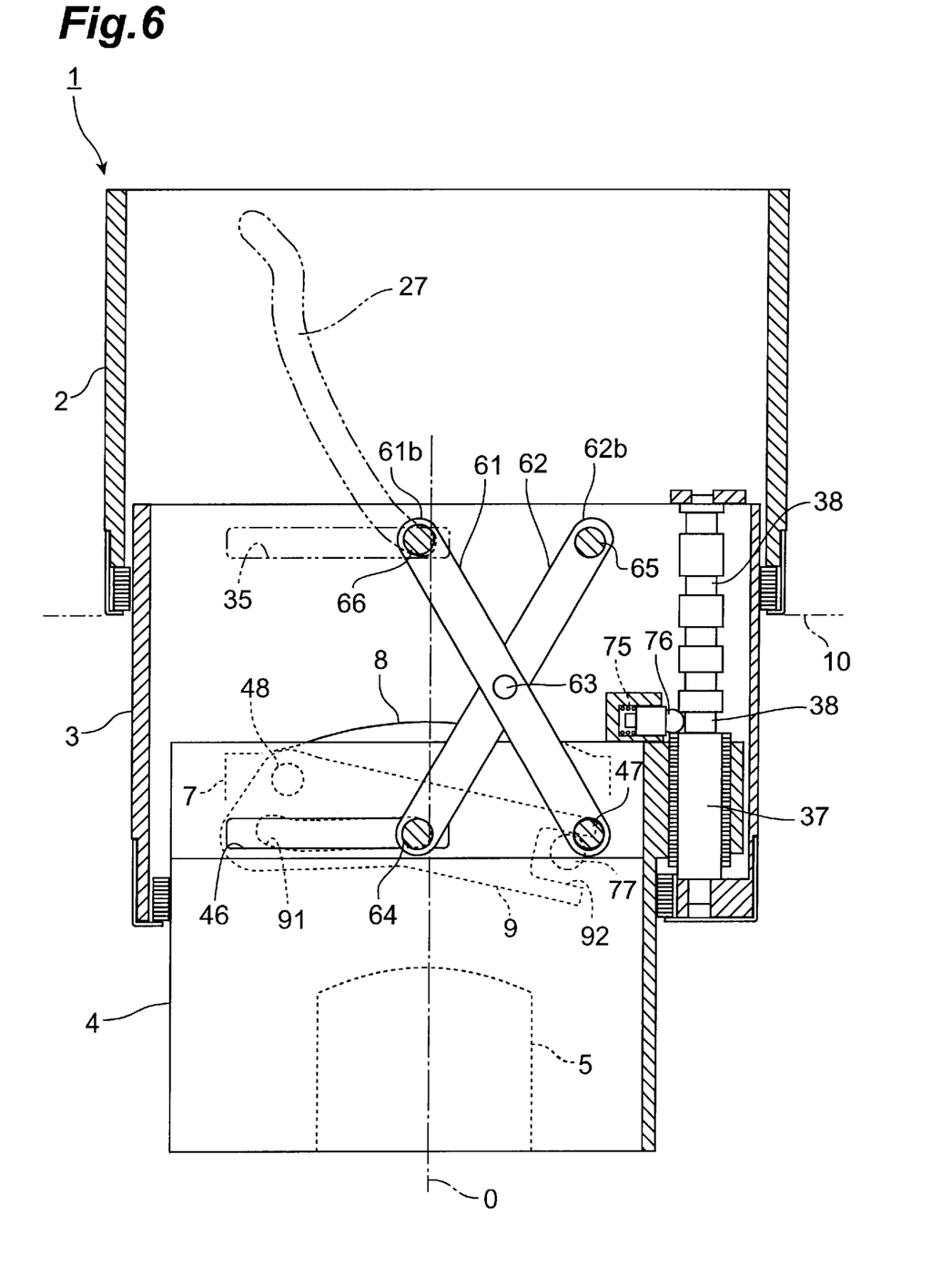
FIG. 6 is an explanatory view of an operation of the camera of FIG. 1.

Also, as shown in FIG. 6, as the intermediate barrel 3 protrudes, the rear end 61b of the link mechanism 6 moves along the cam groove 27, so as to approach the other rear end 62b. Therefore, the angle of intersection between the links 61, 62 increases, whereby the link mechanism 6 extends in parallel with the optical axis O. As a consequence, the movable barrel 4 further protrudes from the intermediate barrel 3, so as to move to a position (TELE wait position) at which telephotography is possible.

On the other hand, since the rear group lens frame 7 containing the rear group lens 8 is engaged with the cam lever 9 pivotally attached to the movable barrel 4, it moves forward along the optical axis O when the cam lever 9 pivots upon movement of the pin 64 as the movable barrel 4 protrudes. Here, while riding over the grooves 38 as being pressed against the outer peripheral face of the guide axis 37, the presser 76 of the rear group lens frame 7 moves in the axial direction thereof. When the movable barrel 4 has moved to the TELE wait position, the presser 76 enters the leading-end groove 38 of the guide axis 37 and is held by the intermediate barrel 3. This movement of the movable barrel 4 to the TELE wait position completes a power-changing operation of the camera 1.

If the shutter switch is pushed in this state, the motor 29 rotates in reverse, whereby the feed screw 24 is conversely rotated by way of the worm gear 28b and the helical gears 28a, 25, so as to retract the intermediate barrel 3.

Figure 7:
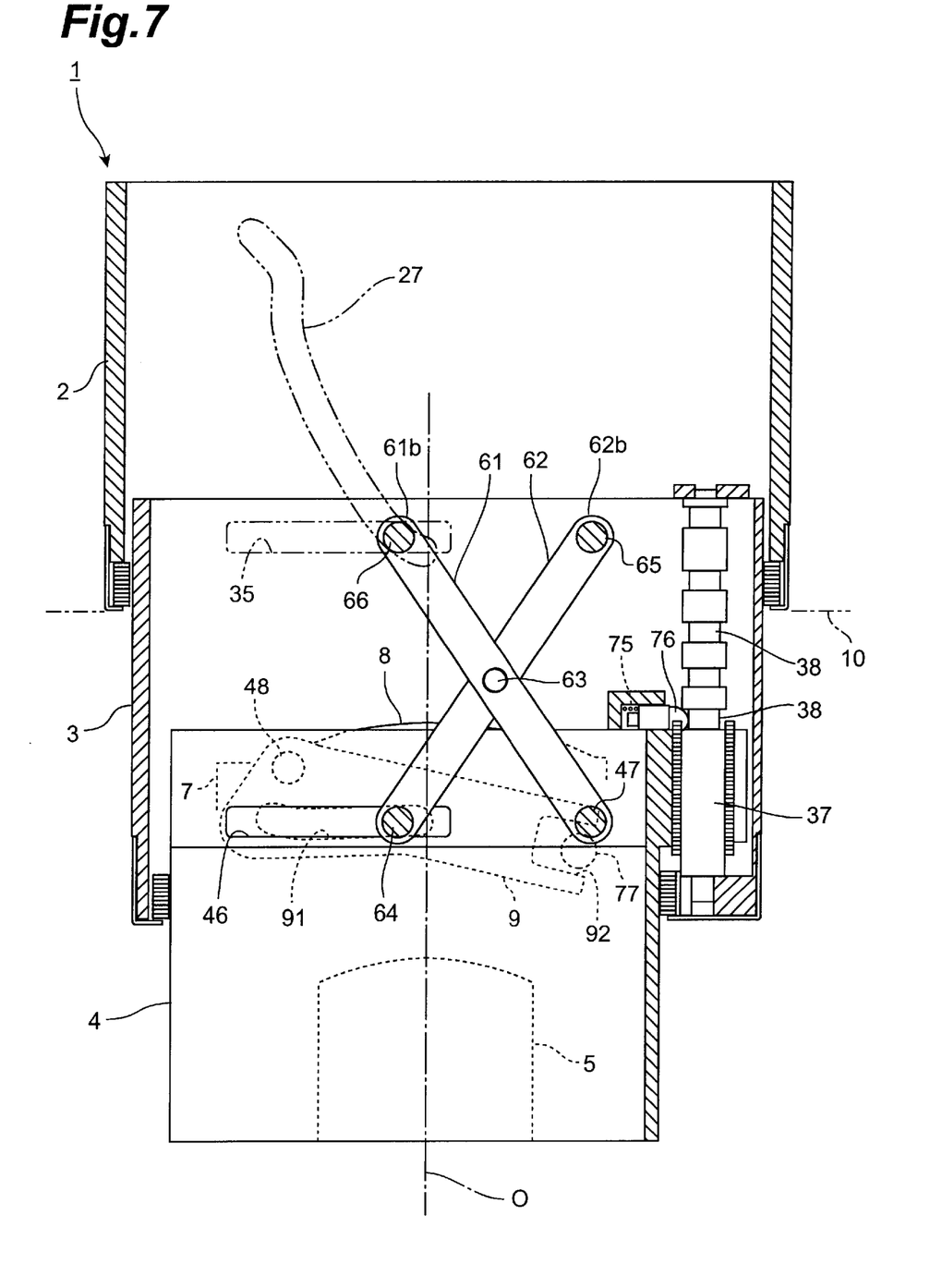
FIG. 7 is an explanatory view of an operation of the camera of FIG. 1.

Also, as shown in FIG. 7, retracting the intermediate barrel 3 contracts the link mechanism 6, thereby retracting the movable barrel 4. Here, upon the operation of retracting the movable barrel 4, the cam lever 9 pivots toward the retracting side. However, since the cutout 92 of the cam lever 9 is formed greater than the outside diameter of the protuberance 77 of the rear group lens frame 7, the rear group lens frame 7 is not moved by the pivoting of the cam lever 9, but is moved together with the intermediate barrel 3 while being held thereby. As a consequence, the front group lens 5 of the movable barrel 4 approaches the rear group lens 8 of the rear group lens frame 7, whereby appropriate focusing can be effected in the optical system constituted by the front group lens 5 and rear group lens 8, and telephotography is possible.

Figure 8:
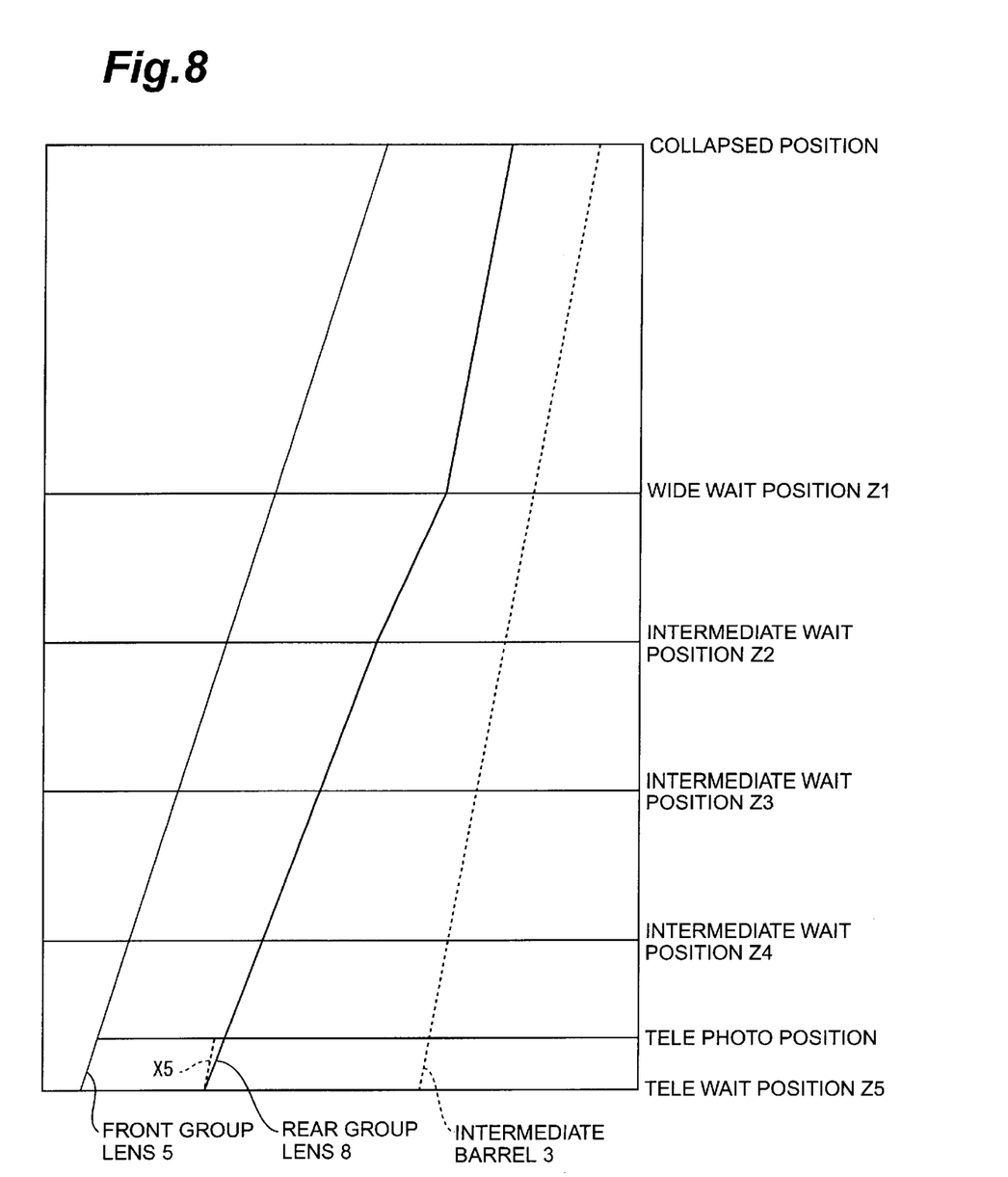
FIG. 8 is an explanatory view of loci of movement of the intermediate barrel, front group lens, and rear group lens according to operations of the camera of FIG. 1.

FIG. 8 shows loci of movement of the front group lens 5 and rear group lens 8 when the intermediate barrel 3 is being protruded.

As shown in FIG. 8, if the intermediate barrel 3 is protruded from the collapsed position, then the front group lens 5 and the rear group lens 8 also protrude in front of the camera 1 as the movable barrel 4 protrudes. Here, from the collapsed position to the WIDE wait position Z1, the rear group lens frame 7 is held by the intermediate barrel 3, whereby the rear group lens 8 moves in parallel with the intermediate barrel 3 by the same amount of movement. Also, the front group lens 5 moves together with the movable barrel 4.

If the intermediate barrel 3 is further protruded from the WIDE wait position Z1, then the pivoting of the cam lever 9 causes the rear group lens frame 7 to yield an amount of movement greater than that of the intermediate barrel 3 and front group lens 5. When the intermediate barrel 3 has protruded to the TELE photography position Z5, the presser 76 enters a groove 38, whereby the rear group lens frame 7 is held by the intermediate barrel 3. If the shutter is released in this state, then the intermediate barrel 3 is retracted for focusing. Here, as indicated by broken line X5 in FIG. 8, the rear group lens 8 moves together with the intermediate barrel 3, and this movement shortens the distance to the front group lens 5, whereby focusing is appropriately carried out.

If the zoom lever of the camera 1 is manipulated for wide-angle photography in the state where the intermediate barrel 3 has protruded to the TELE wait position Z5, then the motor 29 is driven and the feed screw 24 is rotated, whereby the intermediate barrel 3 is retracted, and its accompanying contraction of the link mechanism 6 retracts the movable barrel 4. Here, the rear group lens frame 7 engaging the cam lever 9 moves along the optical axis O together with the movable barrel 4 and stops at the position where the presser 76 enters a groove 38 of the guide axis 37 (e.g., WIDE wait position Z1). As a consequence, a power-changing operation in the optical system constituted by the front group lens 5 and rear group lens 8 is effected.

If the shutter switch is pushed in this state, then the motor 29 rotates in reverse, whereby the feed screw 24 is conversely rotated by way of the worm gear 28b and the helical gears 28a, 25, so as to protrude the intermediate barrel 3. Also, as the intermediate barrel 3 protrudes, the link mechanism 6 extends, so as to protrude the movable barrel 4. Here, the operation of protruding the movable barrel 4 pivots the cam lever 9 toward the retracting side. However, since the cutout 92 of the cam lever 9 is formed greater than the outside diameter of the protuberance 77 of the rear group lens frame 7, the rear group lens frame 7 is not moved by the pivoting of the cam lever 9, but is moved together with the intermediate barrel 3 while being held thereby.

As a consequence, the front group lens 5 of the movable barrel 4 moves away from the rear group lens 8 of the rear group lens frame 7, whereby appropriate focusing can be effected in the optical system constituted by the front group lens 5 and rear group lens 8, and wide-angle photography is possible.

In the lens driving apparatus in accordance with this embodiment, as in the foregoing, when the intermediate barrel 3 and the movable barrel 4 are retracted into a collapsed state, the link mechanism 6 is collapsed in the rear end parts of the movable barrel 4 and intermediate barrel 3, so as to be just contained in the rear end portions in the movable barrel 4 and intermediate barrel 3, which would not be exposed to the outside of the camera 1 even when expanded to the maximum. Therefore, the space within the camera 1 can efficiently be utilized so as to contain the link mechanism 6 therein, whereby the movable barrel 4 and the intermediate barrel 3 can be elongated in the optical axis direction. As a consequence, the camera 1 can be made smaller.

Also, the by use of the cam lever 9, the rear group lens frame 7 can be moved differently from the movable barrel 4. Hence, the distance between the rear group lens 8 and the front group lens 5 can be adjusted, so as to carry out an appropriate power-changing operation.

Further, though the movement of the intermediate barrel 3 pivots the cam lever 9, so as to move the rear group lens 8 along the optical axis O; if the intermediate barrel 3 is moved in reverse, then the rear group lens 8 is held by the intermediate barrel 3 and moves therewith. Therefore, a single driving source and driving mechanism for driving the intermediate barrel 3 can adjust the distance between the rear group lens 8 and the front group lens 5, whereby appropriate focusing can be effected.

The lens guiding mechanism in accordance with this embodiment can carry out a power-changing operation of the optical system by moving the rear group lens frame 7 along the optical axis O together with the movable barrel 4. If the movable barrel 4 is moved along the optical axis O after the rear group lens frame 7 is held by a groove 38 of the guide axis 37, then focusing of the optical system can be effected. As a consequence, a single driving source can easily carry out stepwise zooming. In particular, it is useful in optical instruments which carry out expanding and collapsing operations without rotating lens barrels.

Also, the reaction force of the presser 76 pressing the guide axis 37 can be received by the guide axis 45. Therefore, rotational forces about the second guide axis can be prevented from applying to the rear group lens container, whereby the rear group lens container can be moved appropriately along the optical axis.

Further, when the intermediate barrel 3 and the movable barrel 4 are retracted into a collapsed state, the link mechanism 6 is collapsed in the rear end parts of the movable barrel 4 and intermediate barrel 3, so as to be just contained in the rear end portions in the movable barrel 4 and intermediate barrel 3, which would not be exposed to the outside of the camera 1 even when expanded to the maximum. Therefore, the space within the camera 1 can efficiently be utilized so as to contain the link mechanism 6 therein, whereby the movable barrel 4 and the intermediate barrel 3 can be elongated in the optical axis direction. As a consequence, the camera 1 can be made smaller.

The camera 1 in accordance with this embodiment can change the power of the optical system by moving the movable barrel 4 along the guide axis 37, and can carry out focusing of the optical system by shifting the rear group lens 8 in the moving direction of the movable barrel 4 thereafter so as to move the rear group lens 8 toward or away from the front group lens 5. As a consequence, a single driving source and driving mechanism for driving the movable barrel 4 enables the power-changing and focusing of the optical system.

In particular, it is useful in optical instruments which carry out expanding and collapsing operations without rotating lens barrels.

Also, the reaction force of the presser 76 pressing the guide axis 37 can be received by the guide axis 45. Therefore, rotational forces about the second guide axis can be prevented from applying to the rear group lens container, whereby the rear group lens container can be moved appropriately along the optical axis.

Further, when the intermediate barrel 3 and the movable barrel 4 are retracted into a collapsed state, the link mechanism 6 is collapsed in the rear end parts of the movable barrel 4 and intermediate barrel 3, so as to be just contained in the rear end portions in the movable barrel 4 and intermediate barrel 3, which would not be exposed to the outside of the camera 1 even when expanded to the maximum. Therefore, the space within the camera 1 can efficiently be utilized so as to contain the link mechanism 6 therein, whereby the movable barrel 4 and the intermediate barrel 3 can be elongated in the optical axis direction. As a consequence, the camera 1 can be made smaller.

Though a case where the present invention is applied to the camera 1 as an optical instrument has been explained in this embodiment, the optical instrument in accordance with the present invention is not limited thereto and is also applicable to optical instruments other than the camera.

Second Embodiment

Though the lens driving apparatus, lens guiding mechanism, and camera in accordance with the first embodiment relate to two-stage zooming in which the intermediate barrel 3 and movable barrel 4 are protruded one by one from the fixed barrel 3, the lens driving apparatus, lens guiding mechanism, and camera in accordance with the present invention are not restricted thereto. For example, the lens driving apparatus, lens guiding mechanism, and camera in accordance with the present invention may also relate to zooming of three or higher stages. Such lens driving apparatus, lens guiding mechanism, and camera can also yield operations and effects similar to those in the lens driving apparatus, lens guiding mechanism, and camera in accordance with the first embodiment.

Third Embodiment

Though the first and second embodiments relate to cameras which use a photographic film for taking a picture, the lens driving apparatus, lens guiding mechanism, and camera in accordance with the present invention are not limited thereto and may relate to other optical instruments such as electronic still cameras, video cameras, and the like as long as they have an optical system comprising a front group lens and a rear group lens which move along the optical axis.

As explained in the foregoing, the following effects are obtained by the present invention.

Namely, since the lens driving apparatus in accordance with the present invention comprises movable barrel moving means in which two link pieces are intersected, each link piece can be collapsed into small dimensions when the intermediate barrel and the movable barrel are retracted into a collapsed state. As a consequence, optical instruments can be made smaller.

Also, since there is provided rear group lens moving means for moving the rear group lens along the optical axis by pivoting as the movable barrel moves, the rear group lens can be moved differently from the movable barrel. Consequently, the distance between the rear group lens and the front group lens can be adjusted, so as to carry out an appropriate power-changing operation.

Further, since there is provided rear group lens holding means for holding the rear group lens frame with respect to the intermediate barrel when the intermediate barrel is moved in an opposite direction, if the intermediate barrel is moved in the opposite direction, then the rear group lens is held by the intermediate barrel and moves therewith. As a consequence, a single driving source and driving mechanism for driving the intermediate barrel can adjust the distance between the rear group lens and the front group lens, whereby appropriate focusing can be effected.

The lens guiding mechanism in accordance with the present invention can change the power of the optical system by moving the rear group lens container together with the front group lens container. If the front group lens container is moved along the optical axis after the rear group lens container is held by a groove of the guide axis, then focusing of the optical system can be carried out. As a consequence, a single driving source can easily carry out stepwise zooming.

In particular, it is useful in optical instruments which carry out protruding and retracting operations without rotating lens barrels.

The optical instrument in accordance with the present invention can change the power of the optical system by moving the movable barrel along the guide axis, and can carry out focusing of the optical system by shifting the rear group lens in the moving direction of the movable barrel thereafter so as to move the rear group lens toward or away from the front group lens. As a consequence, a single driving source and driving mechanism for driving the front group lens container enables appropriate power changing and focusing of the optical system.

Also, the reaction force of the presser pressing the first guide axis can be received by the second guide axis. Therefore, rotational forces about the second guide axis can be prevented from applying to the rear group lens container, whereby the rear group lens container can be moved appropriately along the optical axis.

What is claimed is:

1. A lens driving apparatus used in a zoom lens optical system having at least a front group lens and a rear group lens, in which the front group lens and the rear group lens are moved along an optical axis for power changing and focusing, said lens driving apparatus comprising:

an intermediate barrel movable along an optical axis of an optical system;

a movable barrel, containing a front group lens, movable along the optical axis to retract and protrude with respect to said intermediate barrel as said intermediate barrel moves; and movable barrel moving means including two links intersecting each other at an axially supported intersecting part, a front end of said links being attached to said movable barrel, a rear end of said links being attached to said intermediate barrel, said movable barrel moving means expanding and contracting as said intermediate barrel moves, to move said movable barrel along the optical axis.

2. The lens driving apparatus according to claim 1, comprising rear group lens moving means, pivotally attached to said movable barrel, for moving a rear group lens along the optical axis in synchronization with movement of said movable barrel.

3. A lens driving apparatus used in a zoom lens optical system having at least a front group lens and a rear group lens, in which the front group lens and the rear group lens are moved along an optical axis for power changing and focusing, said lens driving apparatus comprising:

an intermediate barrel movable along an optical axis;

intermediate barrel moving means for moving said intermediate barrel along the optical axis;

a movable barrel, containing a front group lens, retracting and protruding with respect to said intermediate barrel in synchronization with movement of said intermediate barrel;

a rear group lens frame, containing a rear group lens, and movable along the optical axis;

rear group lens moving means for moving said rear group lens frame along the optical axis in synchronization with movement of said movable barrel; and rear group lens holding means for breaking synchronization between said intermediate barrel and said movable barrel in a movement range when said intermediate barrel is moved in an opposite direction, and holding said rear group lens frame fixed with respect to said intermediate barrel.

4. The lens driving apparatus according to claim 3, wherein said intermediate barrel is moved in a first direction for power changing and in an opposite, second direction for focusing.

5. A lens guiding mechanism in a zoom lens optical system in which at least a front group lens and a rear group lens are moved along an optical axis for power changing and focusing, said lens guiding mechanism comprising:

a guide axis, parallel to an optical axis, and having a surface with a plurality of grooves spaced at an interval;

a front group lens container, containing a front group lens, and movable along said guide axis;

a rear group lens container, containing a rear group lens, and movable within a range along the optical axis with respect to said front group lens container; and holding means, located in said rear group lens container, elastically pressing said surface of said guide axis, to hold said rear group lens container at a position of one of the grooves.

6. A lens guiding mechanism in a zoom lens optical system in which at least a front group lens and a rear group lens are moved along an optical axis for power changing and focusing, said lens guiding mechanism comprising:

attaching means, having a surface with a plurality of grooves spaced at an interval along an optical axis;

a front group lens container, containing a front group lens, and movable along an optical axis;

a rear group lens container, containing a rear group lens, and movable within a range along the optical axis with respect to said front group lens container; and holding means, located in said rear group lens container, elastically pressing said surface of said attaching means, to hold said rear group lens container at a position of one of the grooves.

7. An optical instrument having a zoom lens optical system in which at least a front group lens and a rear group lens are moved along an optical axis for power changing and focusing, said optical instrument comprising:

a first guide axis, parallel to an optical axis, and having a surface with a groove oriented to intersect the optical axis;

a front group lens container, containing a front group lens, and movable along said first guide axis;

a rear group lens container, containing a rear group lens, comprising a presser elastically pressing said surface of said first guide axis, and movable along the optical axis; and rear group lens moving means, located in said front group lens container, movable together with said front group lens container, said rear group lens moving means applying, along with its movement, a moving force for moving said rear group lens container along the optical axis, to said rear group lens containers and applying no moving force to said rear group lens container within a movement range when a direction of movement of said rear group lens container changes.

8. The optical instrument according to claim 7, comprising a second guide axis, located in said front group lens container, for guiding said rear group lens container parallel to the optical axis, said presser of said rear group lens container being disposed between said first guide axis and said second guide axis.

* * * * *